United States Patent
O'Connor et al.

(10) Patent No.: US 8,460,541 B2
(45) Date of Patent: Jun. 11, 2013

(54) PROCESS FOR CONVERTING CARBON-BASED ENERGY CARRIER MATERIAL

(75) Inventors: Paul O'Connor, Hoevelaken (NL); Dennis Stamires, Dana Point, CA (US); Jacob Adriaan Moulijn, Den Haag (NL)

(73) Assignee: KiOR, Inc., Pasadena, TX (US)

( * ) Notice: Subject to any disclaimer, the term of this patent is extended or adjusted under 35 U.S.C. 154(b) by 0 days.

(21) Appl. No.: 13/008,430

(22) Filed: Jan. 18, 2011

(65) Prior Publication Data

US 2011/0197511 A1   Aug. 18, 2011

Related U.S. Application Data

(63) Continuation of application No. 12/299,319, filed as application No. PCT/EP2007/054375 on May 4, 2007, now Pat. No. 7,901,568.

(30) Foreign Application Priority Data

May 5, 2006 (EP) .................................. 06113545
May 5, 2006 (EP) .................................. 06113567
Feb. 20, 2007 (EP) .................................. 07102737

(51) Int. Cl.
*C10L 3/00* (2006.01)

(52) U.S. Cl.
USPC ............... 208/411; 44/605; 44/606; 208/125; 208/126; 208/400; 208/407; 208/408; 208/409; 208/410

(58) Field of Classification Search
USPC .... 208/125–126, 407–411, 400–405; 44/307, 44/605–606; 585/469, 638, 733
See application file for complete search history.

(56) References Cited

U.S. PATENT DOCUMENTS 4,876,108 A * 10/1989 Underwood et al. ......... 426/650
5,160,636 A * 11/1992 Gilles et al. .................. 210/763
(Continued)

FOREIGN PATENT DOCUMENTS

CA 1123774 5/1982
CA 1163595 6/1984
(Continued)

OTHER PUBLICATIONS

Kamra, D.N. (2007). "Bioconversion of Lignocellulosic Feeds for the Feeding of Ruminants," in Lignocellulose Technology: Future Prospects, edited by R.C. Kuhad & A. Singh, I.K. International, 400 pgs. [Office actions cites chapter on pp. 205-214]I.*

(Continued)

*Primary Examiner* — Brian McCaig
(74) *Attorney, Agent, or Firm* — Jennifer A. Camacho; Natalie Salem; Greenberg Traurig, LLP

(57) ABSTRACT

A process is disclosed process for converting a solid or highly viscous carbon-based energy carrier material to liquid and gaseous reaction products, said process comprising the steps of: a) contacting the carbon-based energy carrier material with a particulate catalyst material b) converting the carbon-based energy carrier material at a reaction temperature between 200° C. and 450° C., preferably between 250° C. and 350° C., thereby forming reaction products in the vapor phase. In a preferred embodiment the process comprises the additional step of: c) separating the vapor phase reaction products from the particulate catalyst material within 10 seconds after said reaction products are formed. In a further preferred embodiment step c) is followed by: d) quenching the reaction products to a temperature below 200° C.

20 Claims, 8 Drawing Sheets

U.S. PATENT DOCUMENTS

| | | | | |
|---|---|---|---|---|
| 5,792,340 | A | * | 8/1998 | Freel et al. ............... 208/127 |
| 6,193,915 | B1 | * | 2/2001 | Lo et al. ..................... 264/44 |
| 7,901,568 | B2 | * | 3/2011 | O'Connor et al. ............ 208/411 |
| 2005/0064577 | A1 | | 3/2005 | Berzin |
| 2008/0053870 | A1 | * | 3/2008 | Marker et al. ............... 208/67 |
| 2011/0154720 | A1 | * | 6/2011 | Bartek et al. ............... 44/307 |

FOREIGN PATENT DOCUMENTS

| | | |
|---|---|---|
| DE | 3734155 | 4/1989 |
| EP | 1852492 | 7/2007 |
| EP | 1852490 | 11/2007 |
| EP | 1970425 | 9/2008 |
| FR | 2478666 | 9/1981 |
| GB | 2003919 | 3/1979 |
| WO | WO 01/34725 | 5/2001 |
| WO | WO 02/14040 | 2/2002 |

OTHER PUBLICATIONS

Jones, L.H.P. et al. (1967), Advances in Agronomy, 19, 107-149.*
Hodson, M.J. et al. (2005). Annals of Botany, 96, 1027-1046.*
Maynard, R.N. (1969). Clays and Clay Minerals, 17, 59-62.*
Bridgwater A V et al. "Fast Pyrolysis Processes for Biomass," Renewable and Sustainable Energy Reviews, Elsevier Science: New York, NY. 4(1): 1-73 (2000).
Craig Hulet et al., "A Review of Short Residence Time Cracking Processes," International Journal of Chemical Reactor Engineering. Berkeley Electronic Press: Berkeley, CA. 3: 1-76 (2005).
Lin et al., "Catalytic Conversion of Commingled Polymer Waste into Chemicals and Fuels Over Spent FCC Commercial Catalyst in Fluidised-Bed Reactor," Applied Catalysis B: Environmental Elsevier. 69(3-4): 145-153 (2006).
International Search Report in International Application No. PCT/EP2007/054375 mailed Sep. 8, 2007.

* cited by examiner

PROCESS FOR CONVERTING CARBON-BASED ENERGY CARRIER MATERIAL

RELATED APPLICATIONS

This application is a continuation of U.S. application Ser. No. 12/299,319, filed on Nov. 3, 2008, now U.S. Pat. No. 7,901,568, which claims benefit of International Application No. PCT/EP2007/054375, filed on May 4, 2007, EP Application No. 06113567.9, filed on May 5, 2006, EP Application No. 07102737.9, filed on Feb. 20, 2007, U.S. Provisional Application No. 60/831,220, filed on Jul. 17, 2006 and of EP Application No. 06113545.5 filed on May 5, 2006, the entirety of each of the foregoing applications is hereby incorporated by reference.

BACKGROUND OF THE INVENTION

1. Field of the Invention

The present invention relates to a catalytic process of converting a carbon-based energy carrier material to a liquid or gaseous fuel.

2. Description of the Related Art

As the supply of light crude diminishes, alternate materials are being developed as a source of liquid and gaseous fuels. Alternate materials being considered include mineral energy carriers, such as heavy crudes, shale oils, tars (e.g., from tar sands) and bitumen.

Alternate materials further include waste supplies of synthetic resins. These synthetic resins may be virgin materials, for example rejects from molding and drawing operations, and used materials, such as recycled packaging materials.

Yet another, and potentially the most important, source of alternate carbon-based energy carrier material includes biomass, in particular biomass containing cellulose, lignin, and hemicellulose.

Processes have been developed for converting these materials to liquid and gaseous fuels. Catalysts have been proposed for use in such processes. Even when catalysts are used, however, the conversion reaction requires relatively high reaction temperatures, often in excess of 450° C. Exposure of the reaction products to these reaction conditions results in a significant deterioration of the reaction products. As a result, valuable materials are converted to undesirable materials such as gas, char and coke, which foul and deactivate the catalyst particles and reduce the yield of the reaction process. Furthermore bio-oil, which is the main reaction product, is of a poor quality and requires extensive costly treatment for it to be made suitable as a transportation fuel or a source for high value chemicals.

The present invention provides an improved process for converting a carbon-based energy carrier material to a liquid or gaseous fuel. The process is characterized in that the conversion temperature is less than 450° C., preferably less than 400° C., and in that the exposure time of reaction products to elevated temperatures and to contact with catalytic material is kept short.

SUMMARY OF THE INVENTION

The present invention relates to a process for converting a solid or highly viscous carbon-based energy carrier material to liquid and gaseous reaction products, said process comprising the steps of:
  a) contacting the carbon-based energy carrier material with a particulate catalyst material
  b) converting the carbon-based energy carrier material at a reaction temperature between 200° C. and 450° C., preferably between 250° C. and 350° C., thereby forming reaction products in the vapor phase.

Step a) may comprise the steps of providing particles of the carbon-based energy carrier material, and coating these particles with smaller particles of the catalyst material.

In an alternate process, step a) may comprise the steps of (i) contacting the carbon-based energy carrier material with a precursor of the catalytic material; and (ii) forming the catalytic material in situ.

In yet another embodiment step a) comprises the step of contacting the carbon-based energy carrier material with a fluid bed of particulate catalyst material. Optionally this process step is carried out at elevated temperature. A heat transfer medium may be present.

It is possible to add more catalytic material to step b). This catalytic material may be the same as that added in step a), or it may be a different catalytic material.

In a preferred embodiment the process comprises the additional step of:
  c) separating the vapor phase reaction products from the particulate catalyst material within 10 seconds after said reaction products are formed;

In a further preferred embodiment step c) is followed by:
  d) quenching the reaction products to a temperature below 200° C.

DETAILED DESCRIPTION OF PREFERRED EMBODIMENTS

Figure 1:
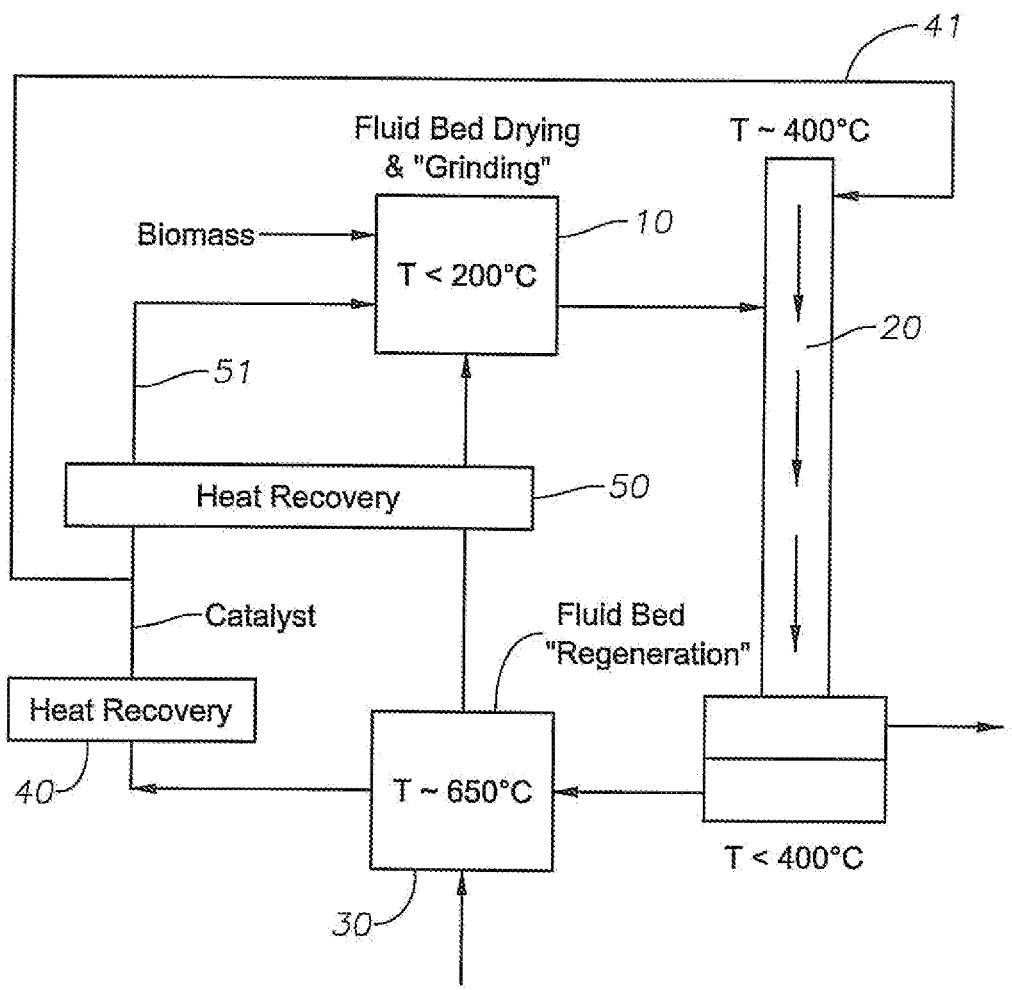
FIG. 1 shows a schematic representation of one embodiment of a process unit for carrying out a process according to the present invention.

The following is a description of certain embodiments of the invention, given by way of example only.

In one aspect, the present invention relates to a pretreatment of particulate carbon-based energy carrier materials so as to make these materials susceptible to a conversion to a liquid fuel under relatively mild conditions.

The carbon-based energy carrier materials for use in the process of the present invention are solid materials and materials that could be classified as liquids, but having a very high viscosity. In this document, the materials will be referred to as "solid". It will be understood that, as used herein, the term solid encompasses highly viscous liquids. In the case of tar sands, the "particles" comprise sand corns that are coated with tar. For the purpose of the present invention these coated sand corns are considered particles of a carbon-based energy carrier.

The materials can be formed into particles, which particles tend to retain their integrity at or near ambient conditions of temperature and pressure. Examples of such materials include coal, tar sand, shale oil, and biomass.

Preferably step a) results in an intimate contact of the catalyst particles with the carbon-based energy carrier. One process involves providing particles of the carbon based energy carrier material, and coating these particles with smaller particles of a catalytic material. The coated particles are subjected to thermal treatment, during which the energy carrier material becomes sensitized.

Another process for sensitizing the carbon based energy carrier material is suitable for energy carrier materials that contain a polymer of photosynthetic origin. In this process, small particles of an inorganic material are embedded within the polymeric material of photosynthetic origin. This process is disclosed in detail in our co-pending patent application entitled "Method of making a polymeric material of photosynthetic origin comprising particulate inorganic material", the disclosures of which are incorporated herein by reference.

Yet another process for sensitizing the carbon based energy carrier material comprises the step of contacting the carbon based energy carrier material with reaction products obtained in step b) of the process of the present invention. It will be understood that when the process is started no reaction product is yet available. Therefore, at this stage, the carbon based energy carrier material may be sensitized by some other method. It is also possible to start the reaction with nonsensitized material, and carry out the pyrolysis step under conventional conditions of temperature and pressure. For example, the reaction may be started at a temperature of up to 600 degrees centigrade, and a pressure between 1 and five bar. Under these conditions, relatively large amounts of organic acids and phenolic materials are produced. Although this is undesirable from the perspective of the need to make useful liquid fuels, this reaction product is practically suitable for mixing with the carbon based energy carrier material for sensitization purposes. Once enough reaction product is formed to operate the reaction with a continuous supply of sensitized material, the pyrolysis conditions can then be changed to a temperature of less than 500 degrees centigrade and, optionally, a pressure of less than one bar.

Another embodiment is particularly suitable if the carbon-based energy carrier is a biomass, in particular solid particulate biomass. In this embodiment the biomass is contacted with a particulate catalytic material and a heat transfer medium.

It has been found that the thermal conversion of biomass materials may be carried out at milder conditions of temperature if the process is carried out in the presence of both a heat transfer medium, for example an inert particulate inorganic material, and a catalytically active material.

In a specific embodiment the particulate inorganic material is used that is both a heat transfer medium and a catalyst.

In a specific embodiment, the catalytically active material is an inorganic oxide in particulate form. Preferably, the particulate inorganic oxide is selected from the group consisting of refractory oxides, clays, hydrotalcites, crystalline aluminosilicates, layered hydroxyl salts, and mixtures thereof.

Examples of refractory inorganic oxides include alumina, silica, silica-alumina, titania, zirconia, and the like. Refractory oxides having a high specific surface are preferred. Specifically, preferred materials have a specific surface area as determined by the Brunauer Emmett Teller ("BET") method of at least 50 m$^2$/g.

Suitable clay materials include both cationic and anionic clays. Suitable examples include smectite, bentonite, sepiolite, atapulgite, and hydrotalcite.

Other suitable metal hydroxides and metal oxides include bauxite, gibbsite and their transition forms. Cheap catalytic material may be lime, brine and/or bauxite dissolved in a base (NaOH), or natural clays dissolved in an acid or a base, or fine powder cement from a kiln.

The term "hydrotalcites" as used herein include hydrotalcite per se, as well as other mixed metal oxides and hydroxides having a hydrotalcite-like structure, as well as metal hydroxyl salts.

The catalytically active material may comprise a catalytic metal. The catalytic metal may be used in addition to or in lieu of the catalytically active inorganic oxide. The metal may be used in its metallic form, in the form of an oxide, hydroxide, hydroxyl oxide, a salt, or as a metallo-organic compound, as well as materials comprising rare earth metals (e.g. bastnesite).

Preferably, the catalytic metal is a transition metal, more preferably a non-noble transition metal. Specifically preferred transition metals include iron, zinc, copper, nickel, and manganese, with iron being the most preferred.

There are several ways in which the catalytic metal compound can be introduced into the reaction mixture. For example, the catalyst may be added in its metallic form, in the form of small particles. Alternatively, the catalyst may be added in the form of an oxide, hydroxide, or a salt. In one preferred embodiment, a water-soluble salt of the metal is mixed with the carbon based energy source and the inert particulate inorganic material in the form of an aqueous slurry. In this particular embodiment, it may be desirable to mix the particles of the biomass with the aqueous solution of the metal salt before adding the inert particulate inorganic material, so as to make sure that the metal impregnates the biomass material. It is also possible to first mix the biomass with the inert particulate inorganic material, prior to adding the aqueous solution of the metal salt. In yet another embodiment, the aqueous solution of the metal salt is the first mixed with the particulate inert inorganic material, whereupon the material is dried prior to mixing it with the particulate biomass In this embodiment, the inert inorganic particles are converted to heterogeneous catalyst particles.

The specific nature of the inert particulate inorganic material is not of critical importance for the process of the present invention, as its main function is to serve as a vehicle for heat transfer. Its selection will in most cases be based on considerations of availability and cost. Suitable examples include quartz, sand, volcanic ash, virgin (that is, unused) inorganic sandblasting grit, and the like. Mixtures of these materials are also suitable. Virgin sandblasting grit is likely to be more expensive than materials such as sand, but it has the advantage of being available in specific ranges of particle size and hardness.

When used in a fluidized bed process, the inert particulate inorganic material will cause a certain level of abrasion of the walls of the reactor, which is typically made of steel. Abrasion is generally undesirable, as it causes an unacceptable reduction in the useful life of the reactor. In the context of the present invention, a moderate amount of abrasion may in fact be desirable. In case there is abrasion, such abrasion could introduce small particles of metal into the reaction mixture, comprising the metal components of the steel of the reactor (mainly Fe, with minor amounts of, for example, Cr, Ni, Mn, etc.). This could impart a certain amount of catalytic activity to the inert particulate inorganic material. It will be understood that the term "inert particulate inorganic material" as used herein includes materials that are by their nature inert, but have acquired a certain degree of catalytic activity as a result of having been contacted with, for example metal compounds.

Sandblasting grit that has previously been used in a sandblasting process is particularly suitable for use in the process of the present invention. Used sandblasting grit is considered a waste material, which is abundantly available at a low cost. Preferred are sandblasting grit materials that have been used in the sandblasting of metal surfaces. During the sandblasting process the grit becomes intimately mixed with minute particles of the metal being sandblasted. In many cases the sandblasted metal is steel. Grit that has been used in the sandblasting of steel presents an intimate mixture comprising small particles of iron, and lesser quantities of other suitable metals such as nickel, zinc, chromium, manganese, and the like. Being in essence a waste product, grit from a sandblasting process is abundantly available at a low cost. Nevertheless, it is a highly valuable material in the context of the process of the present invention.

The effective contacting of the carbon based energy source, the inert inorganic material and the catalytic material is essential and can proceed via various routes. The two preferred routes are:

The dry route, whereby a mixture of the particulate biomass material and the inert inorganic material is heated and fluidized, and the catalytic material is added as fine solid particles to this mixture.

The wet route, whereby the catalytic material is dispersed in a solvent and this solvent is added to the mixture of particulate biomass material and the inert inorganic material. A preferred solvent is water.

The term "fine particulate biomass" as used herein refers to biomass material having a mean particle size in the range of from 0.1 mm to 3 mm, preferably from 0.1 mm to 1 mm.

Biomass from sources such as straw and wood may be converted to a particle size in the range of 5 mm to 5 cm with relative ease, using techniques such as milling or grinding. For an effective thermal conversion it is desirable to further reduce the mean particle size of the biomass to less than 3 mm, preferably less than 1 mm. Comminuting biomass to this particle size range is notoriously difficult. It has now been discovered that solid biomass may be reduced in particle size to a mean particle size range of from 0.1 mm to 3 mm by abrading biomass particles having a mean particle size in the range of 5 mm to 50 mm in a process involving mechanical mixing of the biomass particles with an inorganic particulate material and a gas.

Abrasion of particles in a fluid bed process is a known, and in most contexts an undesirable phenomenon. In the present context this phenomenon is used to advantage for the purpose of reducing the particle size of solid biomass material.

Thus, in one embodiment of the present invention, biomass particles having a particle size in the range of from 5 mm to 50 mm are mixed with inorganic particles having a particle size in the range of from 0.05 mm to 5 mm. This particulate mixture is agitated with a gas. As the inorganic particles have a hardness that is greater than that of the biomass particles, the agitation results in a reduction of the size of the biomass particles. Suitably this process is used for reducing the particle size of the biomass to 0.1 to 3 mm.

The amount of agitation of the particulate mixture determines to a large extent the rate of size reduction of the biomass particles. In order of increasing abrasion activity, the agitation may be such as to form a fluid bed, a bubbling or ebullient bed, a spouting bed, or pneumatic conveyance. For the purpose of the present invention, spouting beds and pneumatic conveyance are the preferred levels of agitation.

The gas may be air, or may be a gas having a reduced level of oxygen (as compared to air), or may be substantially oxygen-free. Examples include steam, nitrogen, and gas mixtures as may be obtained in a subsequent thermal conversion of the fine biomass particles. Such gas mixtures may comprise carbon monoxide, steam, and/or carbon dioxide.

The abrasion process may be carried out at ambient temperature, or at an elevated temperature. The use of elevated temperatures is preferred for biomass particles containing significant amounts of moisture, because it results in a degree of drying of the biomass particles. Drying increases the hardness of the biomass particles, making the particles more susceptible to size reduction by abrasion. Preferred drying temperatures range from about 50 to 150° C. Higher temperatures are possible, in particular if the agitating gas is oxygen-poor or substantially oxygen-free.

Preferred for use in the abrasion process are those inorganic particles that will be used in a subsequent thermal conversion process according to the present invention. In a still further preferred embodiment the catalytic material is also present during the abrasion process. It is believed that some of the catalytic material, if present during the abrasion process, becomes embedded in the biomass particles, which makes the subsequent thermal conversion process more effective.

In a particularly preferred embodiment of the present invention, biomass particles having a particle size in the range of 5 mm to 50 mm are mixed with inert inorganic particles and a catalytic material. This mixture is agitated by a gas, preferably resulting in the formation of a spouting bed or pneumatic conveyance. After the biomass particles reach a mean particle size in the range of 0.1 mm to 3 mm the temperature is increased to 150 to 600° C.

The small biomass particles obtained in the abrasion process are particularly suitable for conversion to a bioliquid in a suitable conversion process. Examples of suitable conversion processes include hydrothermal conversion, enzymatic conversion, pyrolysis, catalytic conversion, and mild thermal conversion.

In an alternate embodiment of step a), particles of the carbon-based energy carrier material are covered with the very small particles of a catalytic material. Conceptually, the particles of the carbon-based energy carrier material are dusted with a coating of catalyst particles. Although both the energy carrier material and the catalytic material are solids, by providing catalyst particles that are much smaller than the particles of the energy carrier material it is possible to provide a very intimate contact between the energy carrier particles and the catalyst particles. As a result it is possible to catalytically convert at least the outer shell of the energy carrier particles, so as to make these particles more susceptible to conversion to liquid fuel components in a subsequent process.

As a first step, carbon-based energy carrier material is provided in the form of small particles. This may be by the grinding, milling, and the like. The most suitable method for making these small particles depends on the nature of the carbon-based energy carrier material. For example, coal may be milled in a ball mill or a hammer mill; other materials may be more conveniently treated in a grinder. The appropriate method may be selected by the skilled person based on general criteria of the feasibility, cost, and hardness of the material to be ground.

If the energy carrier is tar sand the particles comprise sand grains coated or partially coated with a heavy hydrocarbon mixture. In general these particles already have the appropriate size for the process of the present invention. In any event, it is generally not practical to reduce the size of these tar sand particles.

The particle size $d_e$ of the particulate carbon-based energy carrier material preferably is in the range of from 5 mm to 100 micrometers.

The catalyst material is provided in the form of particles having an average particle size de in the range of from 1000 nm to 10 nm. Particles of this size may be obtained by forming inorganic materials from a solution or a slurry, and controlling the conditions so as to favor the formation of particles within this size range. Processes of this kind are well-known, and are not part of the present invention. In an alternate process, inorganic materials may be formed into particles of the desired size by exfoliating or peptizing larger particles.

In a preferred embodiment, the ratio $d_e/d_c$ is in the range of 50,000 to 500. Particle size ratios within these ranges ensure is that the particles of the carbon-based energy carrier material may be coated with a dusting of particles of the catalytic material.

The particles of the carbon-based energy carrier material and the particles of the catalyst are mixed together. This mixing may be done by any suitable method known to the skilled person. The appropriate method will depend on the nature of the carbon-based energy carrier material. In general, methods used for reducing the particle size of the carbon-based energy carrier material tend to be also suitable for this mixing step.

Preferably, the energy carrier particles and cut his particles are makes in a weight ratio in the range of from 1000:1 to 10:1, preferably from 100:1 to 30:1. These weight ratios ensure that a sufficient number of catalyst particles are available to provide at least a partial coating of the energy carrier particles.

An important aspect of the present invention is the reaction temperature in step b) of less than 450° C., preferably less than 400° C. More preferably the reaction temperature is less than 350° C., still more preferably less than 300° C., and most preferably less than 250° C. This reaction temperature is made possible by using a catalytic material selected from the group of cationic clays, anionic clays, natural clays, hydrotalcite-like materials, layered materials, ores, minerals, metal oxides, hydroxides and carbonates of the alkaline and alkaline earth metals, and mixtures thereof.

The catalyst particles are of a size suitable for heterogeneous catalysis. As a general rule, small catalyst particle sizes are preferred in heterogeneous catalysis, because the smaller a particle the greater the fraction of the available atoms that are present at the surface of the particle. Therefore, particle sizes of less than 100 microns are suitable, particles of less than 1,000 nanometers being preferred. It is in general not desirable to use particles smaller than about 100 nm. Although the catalytic activity of such smaller particles is greater, it requires disproportionately greater amounts of energy to create such small particles, and the small particles make it more difficult to separate the particles from product streams after catalytic pyrolysis.

The carbon-based energy carrier material may be from mineral, synthetic or biological origin. Materials from mineral origin include heavy crudes, shale oils, tars (e.g., from tar sands) and bitumen. Materials from synthetic origin include waste supplies of synthetic resins. These synthetic resins may be virgin materials, for example rejects from molding and drawing operations, and used materials, such as recycled packaging materials. Materials from biological origin include biomass, in particular solid biomass containing cellulose, lignin, and lignocellulose. A preferred biomass is biomass of aquatic origin, such as algae.

The carbon-based energy carrier material is either a viscous liquid or a solid, making it difficult to establish an intimate contact between the carbon-based energy carrier material and the particulate catalyst material. It may be necessary to mill the carbon-based energy carrier material together with the particulate catalyst material. In a preferred embodiment of the process, the particulate catalyst material may be "sand blasted" onto the carbon-based energy carrier material. For this purpose the particulate catalyst material is taken up in a stream of inert gas, and the inert gas is caused to flow, e.g., by means of a compressor. In his manner the catalyst particles are given a velocity of at least 1 m/s, preferably at least 10 m/s.

The stream of gas is then impinged upon the carbon-based energy carrier material. Due to their kinetic energy the catalyst particles penetrate the carbon-based energy carrier material, thereby providing the necessary intimate contact.

The sand blasting of particles onto the carbon-based energy carrier material causes mechanical breakup of the latter, which is of particular advantage if this material is a solid. The effect can be reinforced by mixing the catalyst particles with particulate inert material. Preferably the inert material has a particle size similar to that of the catalyst material.

In a particularly preferred embodiment of the process, step a) is carried out in a chemical reactor, such as a fluidized bed reactor, a riser reactor, or a downer reactor. Conveniently, step b) may be carried out in the same reactor as step a).

In step b) reaction products are formed having molecular weights such that these products are in gas or liquid form when at room temperature. At the reaction temperature these reaction products are all in the gas form, which is referred to herein as "reaction products in the vapor phase". It is an important aspect of the present invention that the reaction products in the vapor phase are quickly separated from the particulate catalyst material. Specifically, the reaction products in the vapor phase are separated from the catalyst particles within 10 seconds after they are formed, preferably within 5 seconds, more preferably within 3 seconds. The reaction products generally comprise hydrocarbons and steam.

This separation may be accomplished by applying reduced pressure to the zone of the reactor where this separation takes place. Preferably the reduced pressure is a "vacuum" of less than 500 mBar.

This rapid separation of the reaction products from the catalyst material is an important factor in limiting the degradation of the reaction products. Degradation can be diminished further by rapidly cooling the reaction products after they are separated from the catalyst material. If the separation step involves applying reduced pressure, some cooling of the reaction products will occur as a result of their adiabatic expansion. Further cooling may be accomplished by any means known in the art, for example by pumping the reaction products through a heat exchanger in counter-flow with a cooling medium, such as chilled water.

Preferably, the reaction products are cooled to a temperature below 200° C., preferably below 150° C., within 10 seconds, preferably within 3 seconds, after being separated from the catalytic material.

Some reaction products remain adsorbed to the catalyst particles after separating step c). These materials may be removed by stripping, using methods well known in the art. For example, stripping conditions as used in FCC units are suitable. Although the reaction products removed by stripping may have been in contact with the catalyst material longer than the desired 10 seconds, these materials are not necessarily fully deteriorated.

During the reaction coke may form on the catalyst surface. This coke can be burned off by exposing the catalyst to an oxidative environment, such as air, at elevated temperature. This optional step may be carried but in a regenerator of the type known from FCC processes.

This burning-off step results in the production of $CO_2$. In a preferred embodiment this $CO_2$ is used in the production of biomass, for example by spraying it onto crops or trees under conditions that are favorable for photosynthesis.

The heat generated during the optional regeneration step may be used to supply the heat for the endothermic reaction of step b). To this end, hot catalyst particles from the regenerator are recycled to step a) or b) of the process. The amount of coke deposit may be such that the amount of heat generated during the regeneration step may be greater than what is needed for fueling the conversion reaction. If this is the case, excess heat may be removed from the process by cooling the catalyst particles to a desired temperature prior to recycling them into the reactor. The desired temperature is determined by the heat balance for the process, and the desired reaction temperature for step b). Accordingly, the desired temperature of the catalyst particles just prior to recycle may be determined in a manner similar to that used in FCC processes.

If heat is removed from the regenerated catalyst particles, this heat may be used for generating steam, hot water, or electricity.

In a preferred embodiment the process is carried out in an FCC unit. It may be desirable to carry out step a) in a pre-treatment reactor, prior to introduction of the carbon-based energy carrier material into the riser of the FCC unit.

In a preferred embodiment of the invention a reactive gas is present during at least part of step b). This reactive gas may have oxidative or reductive properties, or the reactive gas may be reactive in isomerisation or alkylation properties. Examples of reactive gases having oxidative properties include air and oxygen, as well as mixtures of oxygen and an inert gas such as nitrogen.

Examples of gases having reductive properties include carbon monoxide, hydrogen sulfide, and hydrogen. Hydrogen may be less preferred, as it may require a high pressure.

Gases having alkylation or isomerisation properties include iso-butane, naphtene, volatile organic acids, and the like.

A particularly preferred embodiment is illustrated in FIG. 1. The figure represents a three-stage process for the mild pyrolysis of a carbon-based energy carrier. The process will be described with reference to biomass, specifically wood chips, as the carbon-based energy carrier. It will be understood that this process is suitable for other forms of biomass, as well as for mineral forms of carbon-based energy carriers.

FIG. 1 shows a fluid bed drying and grinding unit 10. Particulate biomass, such as wood chips or saw dust, is introduced into this unit 10, and blended with a fluid bed of catalyst particles. This mixing may take place at ambient temperature, but it is preferred to operate unit 10 at an elevated temperature. Preferably the temperature is kept at below about 200° C. The mechanical impact of the catalyst particles impinging on the biomass particles provides a grinding action, thereby further reducing the particle size of the biomass. In addition the fluid flow in the fluid bed provides a degree of drying of the biomass particles.

From unit 10 the biomass/catalyst mixture is conveyed to downer reactor 20. At the top of reactor 20 a stream of catalyst particles is introduced at elevated temperature, for example 400° C. The biomass stream undergoes catalytic pyrolysis in reactor 20, whereby volatile reaction products and char and coke are formed. Char and coke deposit onto the catalyst particles. The volatile reaction products are removed from the reactor at the bottom, and separated into non-condensable flue gas (CO, $CO_2$), and liquid reaction products.

The coke- and char containing catalyst particles are conveyed to fluid bed regeneration unit 30. In unit 30 the char and coke are burned off in an oxygen-containing atmosphere such as oxygen or air. In regeneration unit 30 the temperature rises to well above 400° C., for example to about 650° C. The hot catalyst stream from regenerator 30 is conveyed to a first heat exchanger 40, where the temperature is reduced to about 400° C. Heat recovered from the catalyst stream is utilized to generate steam, which may be used as-is in other parts of the plant, may be converted to electric energy and used as such, or sold, etc.

A portion of the catalyst stream from heat exchanger 40 is conveyed to the top of downer reactor 20. Another portion is conveyed to a second heat exchanger 50, where it is cooled to the temperature desired for drying and grinding unit 10, e.g., less than 200° C. Heat recovered from heat exchanger 50 may be used to generate steam or electric energy, for use in other parts of the plant, or sold.

It will be understood that the process may be optimized by varying the temperature at the exit of heat exchanger 40 (and hence the temperature at the top of reactor 20); the temperature at the exit of heat exchanger 50 (and hence the temperature in dryer/grinder 10), the ratio of catalyst streams 41 and 51, etc. In general it is desirable to operate reactor 20 at as low a temperature as possible, preferably below 350° C., more preferably below 300° C.

Instead of downer reactor 20 a riser reactor may be used. It will be understood that in such an arrangement the catalyst and the feed will be introduced at the bottom of the reactor, and product and used catalyst will be collected at its top.

Flash Pyrolysis Test

Figure 2:
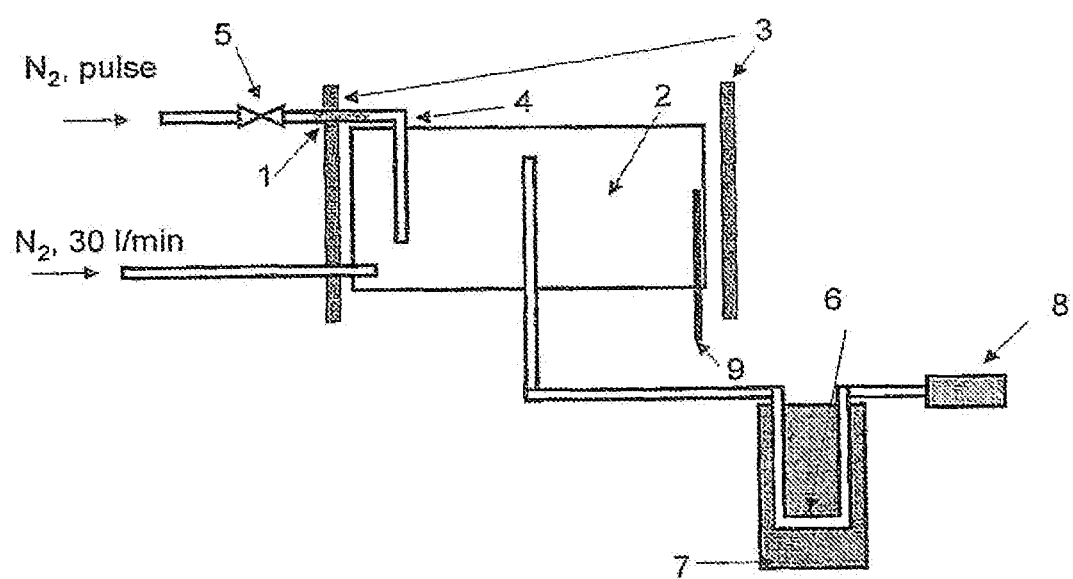
FIG. 2 shows an experimental set-up for conducting pyrolysis experiments.

Flash Pyrolysis Tests (FPT) were Carried Out in the Set-Up Shown in FIG. 2.

The set-up consisted of a feeding section (4) with an automated valve (5) for $N_2$ pulsing to convey biomass or biomass/catalyst sample (1) into a bench-scale cyclonic reactor (2). Heating of the reactor was provided by electrical oven (3) and the temperature was controlled by a thermocouple (9). Carrier gas ($N_2$, 30 l/min) is continuously sent into bottom part of the reactor. Liquefied products were collected in a cooler (6) immersed in liquid nitrogen (7). Frozen liquid products that did not stick to the cooler walls were collected by micro-filter (8).

Flash pyrolysis of biomass or a biomass/catalyst mixture (1) was performed in bench-scale cyclonic reactor (2). The reactor was preheated by electrical oven (3) to the experiment temperature. During all experiments the reactor was flashed with $N_2$ (30 l/min). Biomass (about 1 g) was placed in the feed supply section (4) above the reactor and sent to the reactor with a short pulse of $N_2$, using automated valve (5). To collect liquefied products in a sufficient amount for the following characterization, each experiment contained at least 4 pulses with at least 1 min between pulses (time required to load new portion of sample into the feed section). Liquefied products were collected in a cooler (6) which was kept at minus 196° C. (7). Due to high carrier gas flow some "frozen" liquid went through the cooler and was collected as particles by an outlet micro-filter (8). After the micro-filter carrier gas and non-condensed products went to vent.

After pyrolysis experiments the cooler and the micro-filter were heated to room temperature and condensed products were thoroughly washed by acetone (about 750-800 ml of acetone par experiment). Afterwards acetone was removed using a vacuum rotary evaporator at room temperature.

Chemicals

All chemicals were from Sigma-Aldrich.

Xylan:

Sigma-Aldrich cat No X4252. Name: Xylan from beechwood (synonym: Poly($\beta$-D-xylopyranose[1$\rightarrow$4])); Quality>90% xylose residues.

Lignin: Sigma-Aldrich cat No 371017. Name: Lignin, organosolv;

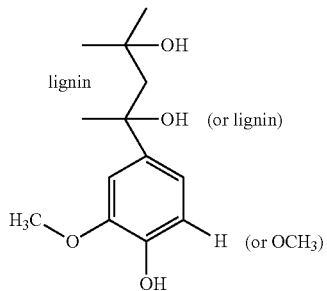

Cellulose A: Sigma Aldrich cat No 43, 523-6; Cellulose Microcrystalline, powder;
High purity cellulose powders for partition chromatography. Bulking agent, opacifier, anti-caking agent, extrusion aid and stabilizer for foams and emulsions.
Features and Benefits Amorphous regions are hydrolyzed leaving crystalline microfibrils. Forms thixotropic gels, good thermal stability.
Form: microcrystalline powder
pH 5-7 (11 wt. %)
bulk density 0.6 g/mL (25° C.)

Differential Thermal Gravimetry

Figure 3:
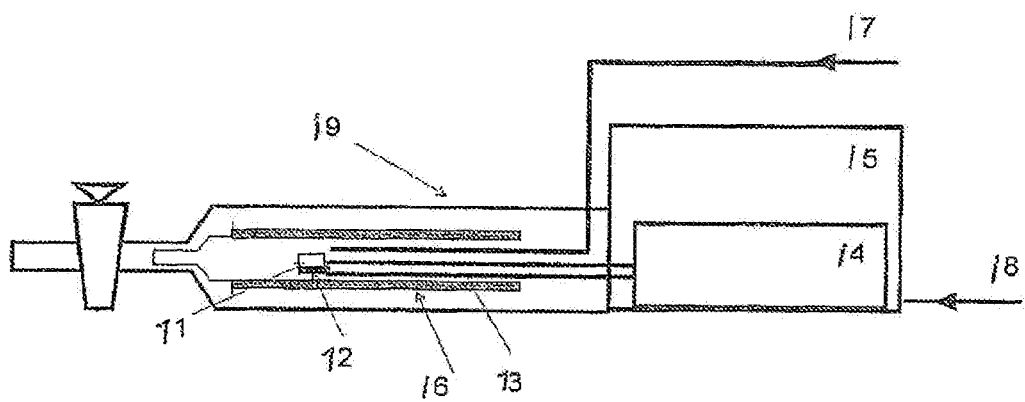
FIG. 3 is a schematic representation of a thermobalance.

Thermal decomposition of the samples was performed using a Mettler-Toledo TGA/SDTA851e thermobalance. A simplified scheme of the unit is shown in FIG. 3

Thermobalance 19 is used as follows. The sample (10-15 mg) contained in an aluminum cup (70 ml) (11) was placed on a cup holder (12) which contained a thermocouple for measuring the sample temperature. Via sample holder (13) the cup was connected to a balance (14) placed in thermostatic block (15) to provide high quality measurement of the sample weight change under thermal treatment. The sample was heated by electrical oven (16) up to desired temperature (max 1100° C.) with a required heating rate (in our experiments 5° C./min). Inert gas (in our case Ar) was provided into the oven via a gas capillary (17). The balance was protected from possible formation of dangerous gases during the experiments by a protective gas supplied continuously via tube (18).

Experiments were conducted with wood particles of Canadian pine (*pinus canadiensis*). Particles were obtained from a wood mill in the form of shavings, having a particle size in the range of 1-10 mm. These shavings were either milled for 5 minutes in a coffee grinder to a particle size of 0.5-1 mm ("pine saw dust"), or to a particle size of about 0.2 mm ("pine powder") in a planetary high energy mill (Pulverisette 5).

Samples were subjected to temperature programmed heating in the above-described thermobalance. The weight of the sample was recorded as a function of temperature. The derivative of this curve was also recorded (referred to as "DTG signal" in FIGS. 4 through 8). The minimum of this curve corresponds to the inflection point of the TG curve, and provides an indication of the decomposition temperature ("T D") of the sample. Experiments were conducted with pure cellulose, xylan (which served as a model compound for hemicellulose), pure lignin, pine saw dust, and pine powder.

In order to measure the effect of the addition of a particulate inorganic material samples were ground together with the inorganic particulate material for 120 minutes in a planetary high energy mill (Pulverisette 5 type). The samples were subjected to temperature programmed decomposition. The decomposition T D temperature and the residue at 600° C. were recorded. Representative curves are presented in FIGS. 4 to 8.

Figure 4:
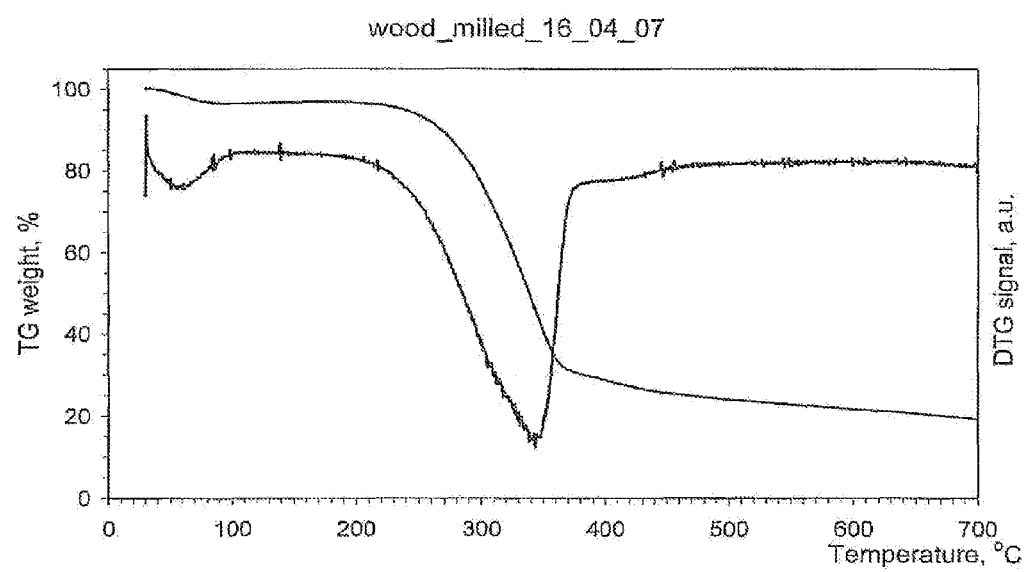
FIG. 4 shows the DTG curve for pine powder.

FIG. 4 shows the DTG curve for pine powder. $T_D$ was 345° C.; the residue was 22 wt %.

Figure 5:
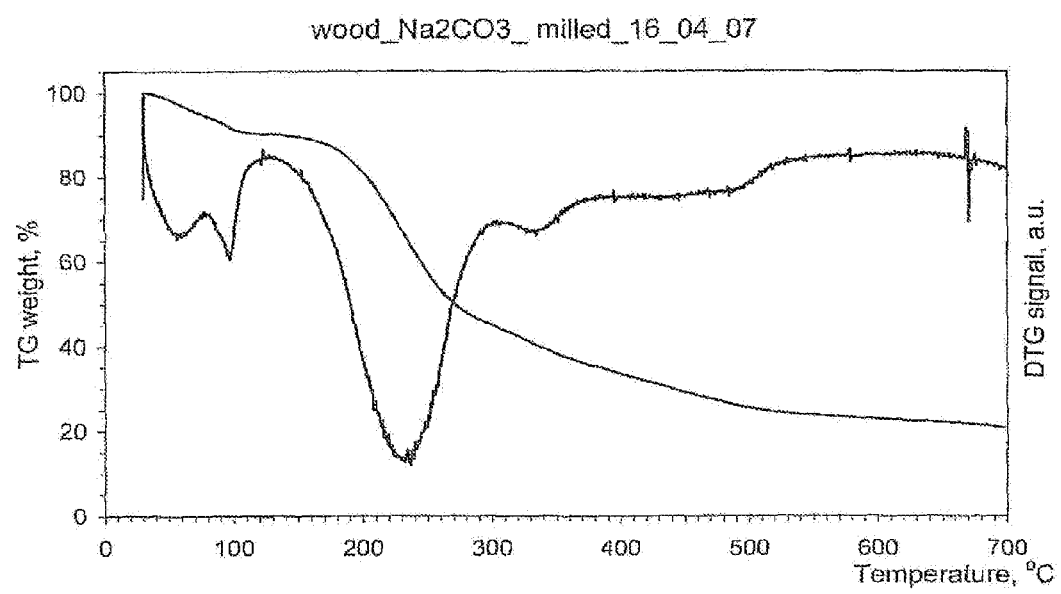
FIG. 5 shows the DTG curve for pine powder co-milled with 20% $Na_2CO_3$.

FIG. 5 shows the DTG curve for pine powder co-milled with 20% $Na_2CO_3$. $T_D$ was 232° C.; the residue was 24%.

Figure 6:
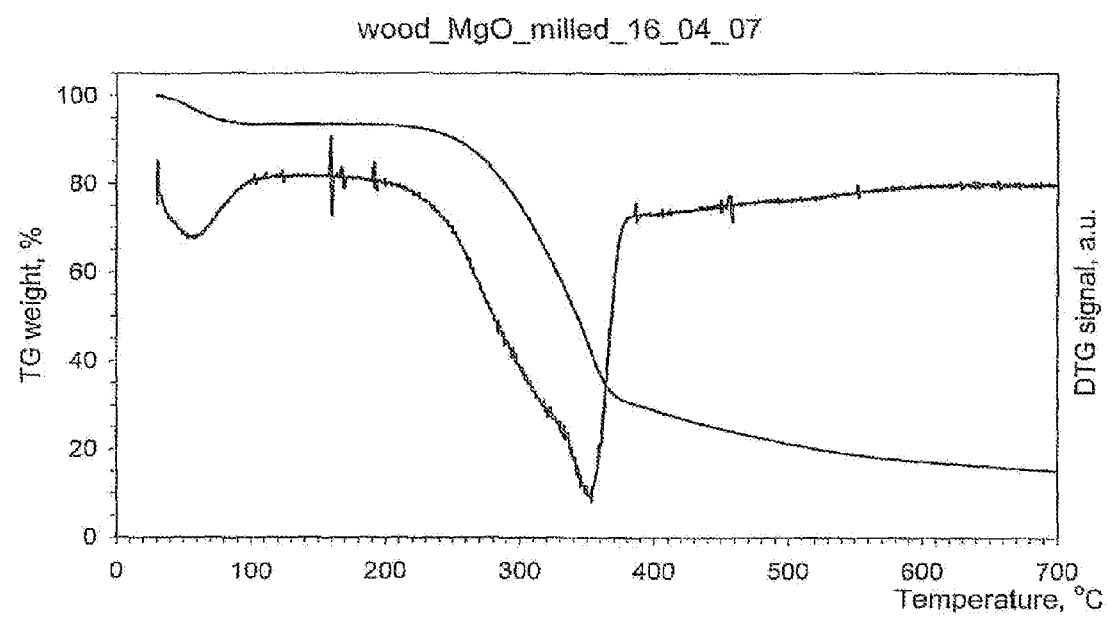
FIG. 6 shows the DTG curve for pine powder co-milled with 20% MgO.

FIG. 6 shows the DTG curve for pine powder co-milled with 20% MgO. $T_D$ was 340° C.; the residue was 17%.

Figure 7:
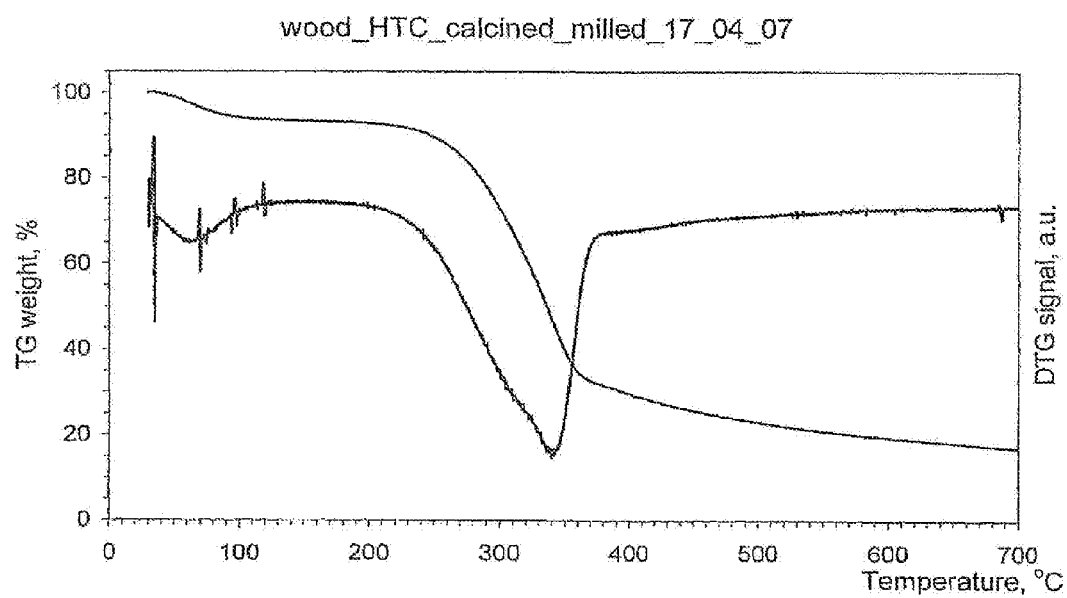
FIG. 7 shows the DTG curve for pine powder co-milled with 20% calcined hydrotalcite.

FIG. 7 shows the DTG curve for pine powder co-milled with 20% calcined hydrotalcite. $T_D$ was 342° C.; the residue was 19%.

Figure 8:
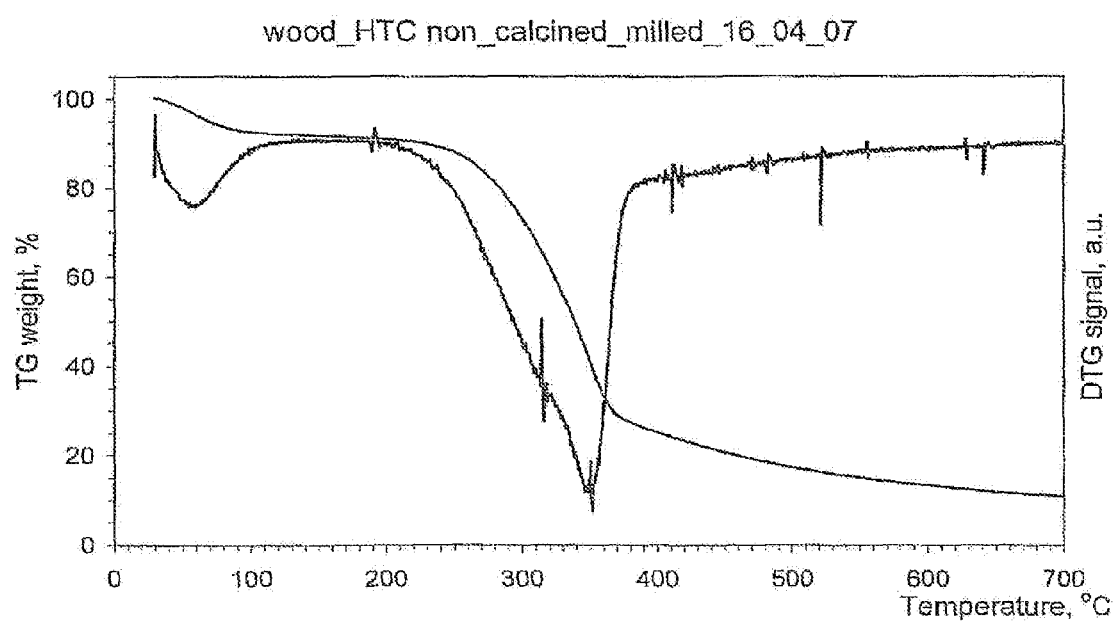
FIG. 8 shows the DTG curve for pine powder co-milled with non-calcined hydrotalcite.

FIG. 8 shows the DTG curve for pine powder co-milled with non-calcined hydrotalcite. $T_D$ was 350° C.; the residue was 13%.

Results from the experiments are collected in Table 1

| Sample | $T_D$(° C.) | % Residue (wt %) |
| --- | --- | --- |
| Cellulose (pure) | 325 | 10 |
| xylan | 270 | 34 |
| lignin (pure) | 342 | 42 |
| pine saw dust | 345 | 34 |
| pine powder | 345 | 22 |
| pine saw dust + 50% $Na_2Co_3$ | 276 | 34 |
| pine powder + 20% $Na_2Co_3$ | 232 | 24 |
| pine powder + 20% $CaCl_2$ | 295 | 33 |
| pine powder + 20% NaCl | 313 | 31 |
| pine powder + $ZrO_4(SO_4)_3$ | 356 | 19 |
| pine powder + 0% MgO | 340 | 17 |
| pine powder + 20% HTC[1] | 350 | 13 |
| pine powder + 20% CBV300[2] | 335 | 11 |
| pine powder + 20% Zn (OH) $CO_3$ | 345 | 20 |
| pine powder + 20% HTC[3] | 326 | 21 |
| xylan + 20% $ZrO_4(SO_4)_3$ | 266 | 30 |
| xylan + 20% NaCl | 266 | 30 |
| xylan + 20% $LiNO_3$ | 263 | 20 |

[1]hydrotalcite (non-calcined)
[2]a commercial silica/alumina/zeolite(Y) catalyst supplied by Zeolyst
[3]hydrotalcite (calcined), supplied by Reheis In a separate comparative experiment pine saw dust, pine powder and pine powder co-milled with 20% $Na_2CO_3$ were subjected to flash pyrolysis as described above. Flash pyrolysis of pine saw dust and pine powder produced a black oil of poor quality and smell, and a low pH. Flash pyrolysis of the pine powder sample co-milled with 20% $Na_2CO_3$ produced an oil that was lighter in color and judged to be of much better quality.

What is claimed is:

1. A process for converting biomass to reaction products, comprising:
   (a) mixing biomass and an inorganic material having catalytic properties, wherein the inorganic material comprises a zeolite or zirconia, and optionally one or more of silica, silica-alumina, and titania, at a temperature below 200° C. to produce a biomass material susceptible to conversion in step b); and (b) heating the biomass material to a reaction temperature ranging from 200° C. to 450° C. to at least partially convert the biomass material to reaction products, wherein the reaction products are liquid, gas, or liquid and gas, and include bio-oil; and (c) recovering said reaction products.

2. The process of claim 1, wherein the reaction products include gaseous reaction products, the process further including separating at least a portion of the gaseous reaction products from the inorganic material within 10 seconds after formation of the reaction products.

3. The process of claim 2, further including separating at least a portion of the gaseous reaction products from the inorganic material within 5 seconds after formation of the reaction products.

4. The process of claim 3, further including separating at least a portion of the gaseous reaction products from the inorganic material within 3 seconds after formation of the reaction products.

5. The process of claim 1, wherein the reaction products include gaseous reaction products, the process further including cooling the gaseous reaction products below a temperature of 200° C.

6. The process of claim 5, further including cooling the gaseous reaction products below a temperature of 200° C. within 10 seconds after being separated from the inorganic material.

7. The process of claim 5, further including cooling the gaseous reaction products below a temperature of 200° C. within 3 seconds after being separated from the inorganic material.

8. The process of claim 5, further including cooling the gaseous reaction products below a temperature of 150° C. within 10 seconds after being separated from the inorganic material.

9. The process of claim 5, further including cooling the gaseous reaction products below a temperature of 150° C. within 3 seconds after being separated from the inorganic material.

10. The process of claim 1, wherein the reaction products include gaseous reaction products, the process further including cooling the gaseous reaction products below a temperature of 150° C.

11. The process of claim 1, wherein the inorganic material includes a mixture of zeolite and silica.

12. The process of claim 1, wherein the inorganic material includes a mixture of a zeolite and a silica-alumina.

13. The process of claim 1, wherein the inorganic material further comprises titania.

14. The process of claim 1, wherein the inorganic material comprises zirconia.

15. The process of claim 1, wherein the biomass includes biomass particulate material, the process further including milling the biomass particulate material to a mean particle size of less than 3 mm.

16. The process of claim 15, wherein the biomass includes biomass particulate material, the process further including milling the biomass particulate material to a mean particle size ranging from 0.1 mm to 3 mm.

17. The process of claim 1, further including drying the biomass at a drying temperature ranging from about 50° C. to about 150° C. before step (a).

18. The process of claim 1, further including recycling the inorganic material for use in a subsequent process for converting biomass to reaction products.

19. The process of claim 1, wherein coke is deposited on the inorganic material during step (b) and the reaction products include gaseous reaction products, the process further including:

separating at least a portion of the gaseous reaction products from the coked inorganic material;

combusting the coke deposited on the inorganic material to heat the inorganic material forming heated inorganic material; and recycling the heated inorganic material for use in a subsequent process for converting biomass to bio-oil.

20. The process of claim 1, wherein the inorganic material comprises a zeolite and zirconia.

* * * * *